United States Patent
Gottfriedsen et al.

(10) Patent No.: US 9,915,558 B2
(45) Date of Patent: Mar. 13, 2018

(54) PARALLELOGRAM LINKAGE STRUCTURE FOR A SCALE

(71) Applicant: Wipotec Wiege- und Positioniersysteme GmbH, Kaiserslautern (DE)

(72) Inventors: Jan Gottfriedsen, Waldfischbach-Burgalben (DE); Tobias Stellwagen, Kaiserslautern (DE)

(73) Assignee: Wipotec Wiege- und Positioniersysteme GmbH, Kaiserslautern (DE)

(*) Notice: Subject to any disclaimer, the term of this patent is extended or adjusted under 35 U.S.C. 154(b) by 178 days.

(21) Appl. No.: 14/937,007

(22) Filed: Nov. 10, 2015

(65) Prior Publication Data
US 2016/0138961 A1 May 19, 2016

(30) Foreign Application Priority Data
Nov. 13, 2014 (DE) .................... 20 2014 105 467 U

(51) Int. Cl.
  *G01G 7/02* (2006.01)
  *G01G 21/24* (2006.01)
(52) U.S. Cl.
  CPC .............. *G01G 7/02* (2013.01); *G01G 21/24* (2013.01)
(58) Field of Classification Search
  CPC .................... G01G 7/02; G01G 21/24–21/248
  See application file for complete search history.

(56) References Cited

U.S. PATENT DOCUMENTS

| 3,063,670 A * | 11/1962 | Young ..................... B23Q 1/36 |
| | | 177/DIG. 9 |
| 4,100,985 A | 7/1978 | Meier |
| 4,553,618 A | 11/1985 | Kusmenskji et al. |
| 5,771,986 A | 6/1998 | Kohn et al. |
| 6,232,567 B1 | 5/2001 | Bonino et al. |
| 6,365,847 B1 | 4/2002 | Mueller et al. |
| 7,534,971 B2 * | 5/2009 | Kuhlmann ........... G01G 21/244 |
| | | 177/210 EM |
| 2011/0278077 A1 * | 11/2011 | Erben ..................... G01G 7/02 |
| | | 177/211 |

FOREIGN PATENT DOCUMENTS

| DE | 1052708 B | 3/1959 |
| DE | 3230998 C2 | 2/1984 |
| DE | 3243350 A1 | 9/1984 |
| DE | 19729623 A1 | 1/1999 |
| DE | 20008066 U1 | 11/2000 |

* cited by examiner

Primary Examiner — Natalie Huls
(74) Attorney, Agent, or Firm — The Webb Law Firm

(57) ABSTRACT

Monolithic linkage structure having a base body and a load receiver guided in a Z direction relative to the base body by a plurality of parallel guide elements, wherein at least one parallel guide element is connected, via a first joint, on a first end to the base body and, via a second joint, on a second end distanced from the first end in an X direction to the load receiver, wherein the base body is configured on both sides of a plane, which extends in the Z direction and in an X direction, and wherein at least one parallel guide element has, on at least one outer surface facing away from the plane between the first joint and the second joint, at least one recess penetrating the at least one parallel guide element in the Z direction, through which projects a base body portion of the base body.

20 Claims, 1 Drawing Sheet

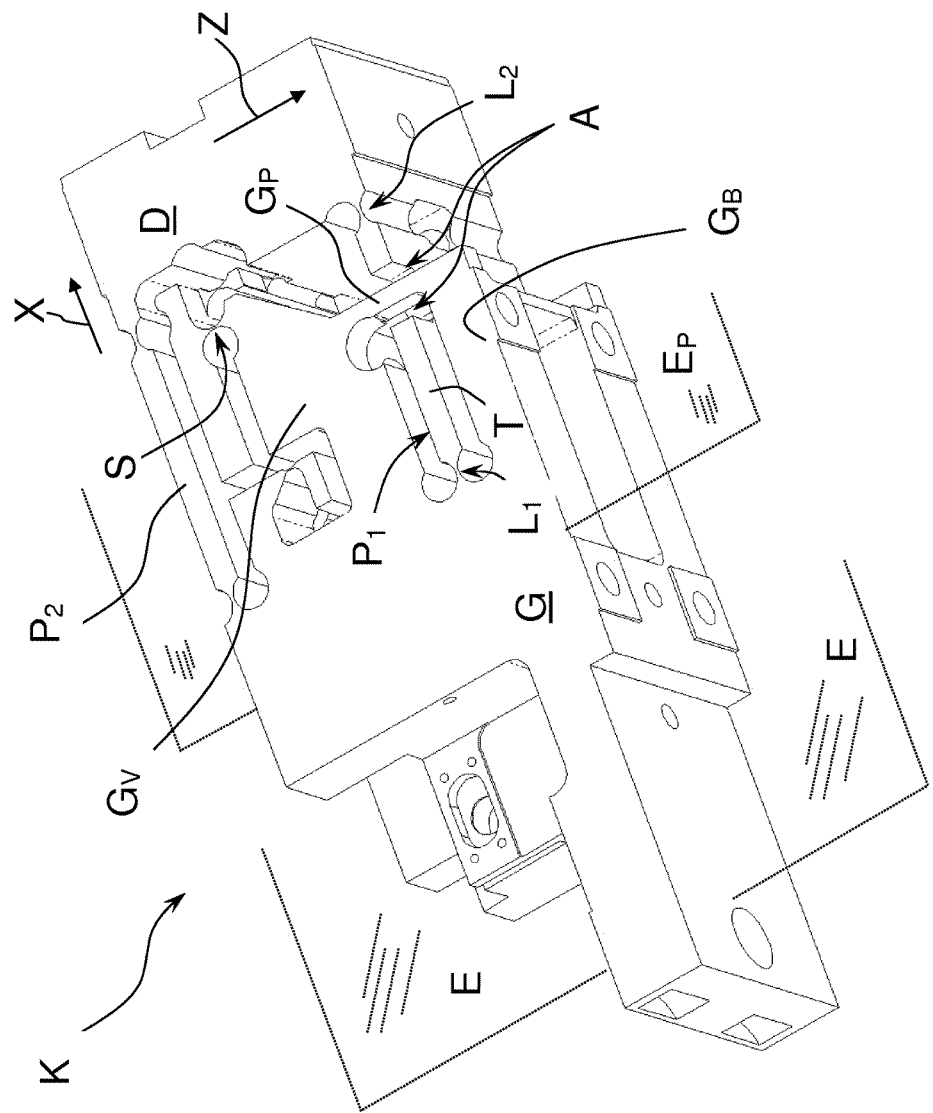

PARALLELOGRAM LINKAGE STRUCTURE FOR A SCALE

CROSS-REFERENCE TO RELATED APPLICATION

This application claims priority to German Patent Application No. 20 2014 105 467.7 filed Nov. 13, 2014, the disclosure of which is hereby incorporated in its entirety by reference.

BACKGROUND OF THE INVENTION

Field of the Invention

The present invention relates to a parallelogram linkage structure for a scale, in particular a scale operating according to the electromagnetic force compensation principle.

Description of Related Art

Such parallelogram linkage structures are used for guiding a load receiver under load parallel to an as a rule stationary base body. Via a lever assembly coupled to the load receiver, the movement of the load receiver is reduced one or several fold and thus amplified, lastly for metrologically detecting the deflection of a lever or of a magnet arranged thereon or of a coil.

For stability reasons, the two parallel linkages (also referred to as "parallel guide elements" in the following) guiding the load receiver are spaced apart from one another as far as possible in the movement direction Z of the load receiver. The base body projects between these parallel guide elements, in order to form supporting points for the aforementioned lever mechanism there. For high precision scales, this gives rise to the problem of the projecting part of the base body (also known as the "scale bearing") has limited rigidity. The closer the two parallel guide elements are to one another in the Z direction, the less this rigidity, meaning that the projecting scale bearing can only be configured with correspondingly less height. While spacing the parallel guide elements further apart in the Z direction also allows a correspondingly more strongly dimensioned scale bearing between them, the desired maximum possible compactness of overall dimensions of the parallelogram linkage structure is sacrificed.

In order to ensure a rigid scale bearing of maximum stability between the parallel guide elements, the prior art makes provision for breaching the parallel guide elements within the monolithic structure and for guiding a part of the base body through this breach, also for bracing the projecting part.

DE 32 30 998 C2 discloses the provision of a bearing projection projecting vertically through the bottom parallelogram linkage for forming a lever supporting point. A similar procedure is followed in U.S. Pat. No. 4,100,985 A, but instead of a base body portion, a lever mechanism is guided through the parallelogram linkage here.

DE 20 008 066 U1 shows a monolithic parallelogram linkage structure in which each parallelogram linkage has a centrically formed recess in order to create access for machining tools, without additionally bracing the projecting part of the base body.

DE 197 29 623 B4 shows how an elongate base body is fastened onto a scale frame by means of two screws, wherein the two screws go through an opening in the bottom parallel linkage. Centrically penetrating the parallelogram linkage has the disadvantage of the mount becoming narrow and thus reducing torsional rigidity. A lateral mounting of the projecting part of the base body is proposed in another embodiment of DE 197 29 623 B4. Although the lateral mounting elements make the overall system quite rigid, the width of the necessary installation space likewise increases. In both cases the metrologically sensitive projecting part of the base body is disadvantageously influenced by tightening torques.

SUMMARY OF THE INVENTION

One object of the invention was, therefore, to provide an improved parallelogram linkage structure, which is especially rigid against forces in the measurement direction and to torques with a horizontal rotation axis and which requires little installation space. The mounting points should furthermore be spaced as far as possible from the lever supporting point.

Accordingly, and in one preferred and non-limiting embodiment or aspect, provided is a monolithic parallelogram linkage structure for a scale, comprising a base body and a load receiver guided in a Z direction relative to the base body by a plurality of parallel guide elements, a) wherein at least one parallel guide element is connected, via a first joint, on a first end to the base body and, via a second joint, on a second end distanced from the first end in an X direction to the load receiver, b) wherein the base body is configured on both sides of a plane, which extends in the Z direction and in an X direction preferably running perpendicular thereto, and c) wherein at least one parallel guide element has, on at least one outer surface facing away from the plane between the first joint and the second joint, at least one recess penetrating the at least one parallel guide element in the Z direction, through which projects a base body portion of the base body.

In one preferred and non-limiting embodiment or aspect, a first portion of the at least one parallel guide element extends from the first joint to the at least one recess, and the base body completely surrounds the first portion along an imaginary outer plane parallel to the plane.

In one preferred and non-limiting embodiment or aspect, the at least one recess is situated closer to the second joint than to the first joint.

In one preferred and non-limiting embodiment or aspect, the at least one outer surface of the at least one parallel guide element aligns with an outer wall portion of the base body.

In one preferred and non-limiting embodiment or aspect, at least one supporting joint for bracing a lever is arranged on the base body in the Z direction between two parallel guide elements, and wherein an outer surface of the supporting joint aligns with an outer surface of the base body portion.

In one preferred and non-limiting embodiment or aspect, the plurality of parallel guide elements are configured symmetrically to a plane, and at least one of the parallel guide elements has, on both outer surfaces facing away from the plane between the first joint and the second joint, in each case at least one recess penetrating the at least one parallel guide element in the Z direction, through which a base body portion of the base body protrudes.

In another preferred and non-limiting embodiment or aspect, provided is a scale comprising a monolithic parallelogram linkage structure, comprising a base body and a load receiver guided in a Z direction relative to the base body by a plurality of parallel guide elements, wherein at least one parallel guide element is connected, via a first joint, on a first end to the base body and, via a second joint, on a second end distanced from the first end in an X direction to the load receiver, wherein the base body is configured on both sides of a plane, which extends in the Z direction and in an X direction preferably running perpendicular thereto, and wherein at least one parallel guide element has, on at least one outer surface facing away from the plane between the first joint and the second joint, at least one recess penetrating the at least one parallel guide element in the Z direction, through which projects a base body portion of the base body.

BRIEF DESCRIPTION OF THE DRAWING

FIG. 1 is a perspective view of a linkage structure for a scale according to the principles of the present invention.

DETAILED DESCRIPTION OF THE INVENTION

The invention is based on the finding of being able to produce a particularly rigid base body portion between the parallelogram linkages very easily wherein at least one linkage has, on its outer surface, an indentation through which a base body portion can extend in the area between the parallel linkages. This manufacturing route is especially simple and essentially only weakens the parallelogram linkage structure to torques about the vertical axis which, however, only play a minor role in the operation of a scale.

Accordingly, an embodiment of the invention comprises a base body and a load receiver guided in the Z direction relative to the base body by means of parallel guide elements. At least one parallel guide element is connected on a first end to the base body via a joint known per se, for example via a monolithically configured thin place. In an X direction running preferably perpendicular to the Z direction, the parallel guide element extends from the first joint to its opposite second end, where it is connected to the load receiver via a comparable joint.

The base body is configured on both sides of a (an imaginary) plane E, which extends in the Z direction and in an X direction preferably perpendicular thereto. Preferably, but not necessarily, the base body can be configured symmetrically to the plane E.

According to the invention, at least one of the parallel guide elements has, on its outer surface facing away from the plane E between the first joint and the second joint, at least one recess, which penetrates the parallel guide element in the Z direction and through which a portion of the base body protrudes. Unlike in the prior art, the base body herein is not guided through a breach running in the Z direction in a parallel guide element (and which lies entirely within the parallel guide element). Instead the parallel guide element is provided with a recess or indentation in the sense of a depression formed in the side such that the parallel guide element has a somewhat reduced overall width at this point. In this manner the base body can be guided between the parallel guide elements in a zone of maximum width (from above through the top parallel guide element and/or from below through the bottom parallel guide element). There it transitions in one piece into a portion of the base body projecting in the X direction between the parallel guide elements, wherein by virtue of this construction, said portion is braced in a particularly stable manner and the supporting joints provided between the parallel guide elements for lever assemblies are thus carried particularly effectively by the base body, because the latter can press downward and/or upward (against a part of the base body projecting below the bottom parallel guide element or above the top parallel guide element, respectively) through the at least one lateral recess of the parallel guide element or elements according to the invention.

The recess of the invention divides the respective parallel guide element into a first portion and a second portion. The first portion extends from the first joint arranged on the base body to the recess, whereas the second extends from the recess to the second joint arranged on the load receiver. Because the parallel guide elements as well as the base body are to make the best possible use of the maximum available width (perpendicular to the plane E), according to another advantageous embodiment of the invention a plane $E_P$ can be defined, which should run parallel to the plane E and is theoretically positionable such that the base body completely surrounds the first portion of the parallel guide element along this plane $E_P$ and that furthermore the plane $E_P$ also coincides with the outer surface of the first portion. Up to the point of the recess A, the parallel guide element or at least its first portion thus has the same width as the base body, thus giving rise to exceptional torsional rigidity.

The effect according to the invention of the especially effective bracing of the base body projecting between the parallelogram linkage structure achieved with the base body portion protruding through the recess A has an especially positive impact in the case where the recess A is situated distinctly closer to the second joint, i.e., to the load receiver, than to the first joint. The "braced" scale bearing can thus extend very close to the load receiver, and with it the supporting point for a reducing lever, which engages with one end on the load receiver.

Loads acting on the supporting joint in the Z direction can be introduced with little or even without any leverage effect in the Z direction into the base body present above or below the parallel guide elements. The base body portion projecting in the X direction between the parallel guide elements is braced by the base body portion of the invention and is therefore only slightly or not at all subjected to bending—the supporting point cannot lower under load and measurement precision is increased accordingly.

Because the base body can be guided at the point of its maximum width through the recess of the invention, a supporting joint to be provided on the base body between the parallelogram guide elements can be very effectively braced on the maximum width of the base body, in other words the full width of the base body could be used to support the joint.

An advantageous embodiment of the invention makes provision such that the parallel guide elements are configured symmetrically to the plane E. At least one parallel guide element then has two symmetrically opposite recesses A in relation to the plane E, through which the base body (at least along the recesses A) can likewise extend symmetrically between the parallelogram linkage structures upwards or downwards in the Z direction.

Compared to the prior art, a compact scale with the parallelogram linkage structure of the invention is particularly rigid against forces in the measurement direction and against torques with a horizontal rotation axis, and is at the same time not sensitive to off-center loading.

An embodiment is explained in the following, with reference to a FIGURE:

The only FIG. 1 shows a monolithic parallelogram linkage structure K. On a first joint $L_1$ a base body G, which is generally stationarily arranged, carries a first parallel guide element $P_1$, which extends in the X direction to a second joint $L_2$, where it engages on a load receiver D moveable in the Z direction.

Another parallel guide element $P_2$ is arranged in the Z direction adjacent to the first parallel guide element $P_1$ and, parallel to the same, likewise extends to the load receiver D. The joints via which the second parallel guide element $P_2$ engages respectively on the base body G and on the load receiver D are not identified in FIG. 1.

By means of the two parallel guide elements $P_1$ and $P_2$, the load receiver D is virtually moveable in the Z direction relative to the base body G. An imaginary plane E indicated in FIG. 1 divides the parallelogram linkage structure K more or less symmetrically lengthwise into a front part and a back part. The plane E is defined by the Z direction, in which load introduction takes place, and by an X direction running perpendicular hereto (in the lengthways direction of the parallelogram linkage structure K). On the outer surface of the first parallel guide element $P_1$ facing away from the plain E in each case, said guide element is equipped with a recess A (which in FIG. 1 is only specifically indicated on the front side facing the viewer). A base body portion $G_P$ formed in one piece with the base body G protrudes through the recess A in the Z direction. Where the base body portion $G_P$ protrudes through the parallel guide element $P_1$, the width of the latter is correspondingly reduced (by "width" is meant the direction perpendicular to the plane E).

Between the top and the bottom parallel guide elements $P_2$, $P_1$ is arranged a supporting joint S on the base body G, on which rests a (not specifically identified) lever connected to the load receiver D. The supporting joint S has the same width as the base body G or rather the base body portion $G_P$—all three components lie with their outer surface facing away from the plane E in a common outer plane $E_P$, which defines the maximum dimensions of the parallelogram linkage structure on the side of the plane E facing the viewer. The portion T of the first parallel guide element $P_1$ running from the first joint $L_1$ to the recess A likewise runs with its outer surface in this outer plane $E_P$.

According to the invention, a force introduced via the load receiver D into the supporting joint S and acting in the Z direction can be transferred into the base portion $G_B$ of the base body G extending below the first parallel guide element $P_1$. The supporting effect of the base body portion $G_P$ stabilizes the part $G_V$ of the base body G projecting (from the left to the right in FIG. 1) between the parallel guide elements and thus fixes the position of the supporting joint S relative to the base body G. By virtue of the fact that the base body portion $G_P$ (on the front side and back side of the imaginary plane E in FIG. 1) runs along the maximum width of the parallelogram linkage structure, the supporting joint S also becomes particularly rigid to torsion, i.e., is braced against swiveling about the X axis.

The invention claimed is:

1. A monolithic parallelogram linkage structure for a scale, comprising a base body and a load receiver guided in a Z direction relative to the base body by a plurality of parallel guide elements,
   a) wherein at least one parallel guide element is connected, via a first joint, on a first end to the base body and, via a second joint, on a second end distanced from the first end in an X direction to the load receiver,
   b) wherein the base body is configured on both sides of a plane, which extends in the Z direction and in an X direction running perpendicular thereto, and
   c) wherein the at least one parallel guide element has, on at least one outer surface facing away from the plane between the first joint and the second joint, at least one recess extending through the at least one parallel guide element in the Z direction, through which projects a base body portion of the base body.

2. The parallelogram linkage structure as in claim 1, wherein a first portion of the at least one parallel guide element extends from the first joint to the at least one recess, and the base body completely surrounds the first portion along an imaginary outer plane parallel to the plane.

3. The parallelogram linkage structure as in claim 2, wherein the at least one recess is situated closer to the second joint than to the first joint.

4. The parallelogram linkage structure as in claim 2, wherein the at least one outer surface of the at least one parallel guide element aligns with an outer wall portion of the base body.

5. The parallelogram linkage structure as in claim 2, wherein at least one supporting joint for bracing a lever is arranged on the base body in the Z direction between two parallel guide elements, and wherein an outer surface of the supporting joint aligns with an outer surface of the base body portion.

6. The parallelogram linkage structure as in claim 2, wherein the plurality of parallel guide elements are configured symmetrically to the plane and at least one of the parallel guide elements has, on both outer surfaces facing away from the plane between the first joint and the second joint, in each case at least one recess penetrating the at least one parallel guide element in the Z direction, through which a base body portion of the base body protrudes.

7. The parallelogram linkage structure as in claim 2, wherein the scale operates according to the electromagnetic force compensation principle.

8. The parallelogram linkage structure as in claim 1, wherein the at least one recess is situated closer to the second joint than to the first joint.

9. The parallelogram linkage structure as in claim 8, wherein the at least one outer surface of the at least one parallel guide element aligns with an outer wall portion of the base body.

10. The parallelogram linkage structure as in claim 8, wherein at least one supporting joint for bracing a lever is arranged on the base body in the Z direction between two parallel guide elements, and wherein an outer surface of the supporting joint aligns with an outer surface of the base body portion.

11. The parallelogram linkage structure as in claim 8, wherein the plurality of parallel guide elements are configured symmetrically to the plane and at least one of the parallel guide elements has, on both outer surfaces facing away from the plane between the first joint and the second joint, in each case at least one recess penetrating the at least one parallel guide element in the Z direction, through which a base body portion of the base body protrudes.

12. The parallelogram linkage structure as in claim 8, wherein the scale operates according to the electromagnetic force compensation principle.

13. The parallelogram linkage structure as in claim 1, wherein the at least one outer surface of the at least one parallel guide element aligns with an outer wall portion of the base body.

14. The parallelogram linkage structure as in claim 13, wherein at least one supporting joint for bracing a lever is arranged on the base body in the Z direction between two parallel guide elements, and wherein an outer surface of the supporting joint aligns with an outer surface of the base body portion.

15. The parallelogram linkage structure as in claim 13, wherein the plurality of parallel guide elements are configured symmetrically to the plane and at least one of the parallel guide elements has, on both outer surfaces facing away from the plane between the first joint and the second joint, in each case at least one recess penetrating the at least one parallel guide element in the Z direction, through which a base body portion of the base body protrudes.

16. The parallelogram linkage structure as in claim 1, wherein at least one supporting joint for bracing a lever is arranged on the base body in the Z direction between two parallel guide elements, and wherein an outer surface of the supporting joint aligns with an outer surface of the base body portion.

17. The parallelogram linkage structure as in claim 16, wherein the plurality of parallel guide elements are configured symmetrically to the plane and at least one of the parallel guide elements has, on both outer surfaces facing away from the plane between the first joint and the second joint, in each case at least one recess penetrating the at least one parallel guide element in the Z direction, through which a base body portion of the base body protrudes.

18. The parallelogram linkage structure as in claim 1, wherein the plurality of parallel guide elements are configured symmetrically to a plane, and at least one of the parallel guide elements has, on both outer surfaces facing away from the plane between the first joint and the second joint, in each case at least one recess penetrating the at least one parallel guide element in the Z direction, through which a base body portion of the base body protrudes.

19. The parallelogram linkage structure as in claim 1, wherein the scale operates according to the electromagnetic force compensation principle.

20. A scale comprising a monolithic parallelogram linkage structure, comprising a base body and a load receiver guided in a Z direction relative to the base body by a plurality of parallel guide elements, wherein at least one parallel guide element is connected, via a first joint, on a first end to the base body and, via a second joint, on a second end distanced from the first end in an X direction to the load receiver, wherein the base body is configured on both sides of a plane, which extends in the Z direction and in an X direction running perpendicular thereto, and wherein the at least one parallel guide element has, on at least one outer surface facing away from the plane between the first joint and the second joint, at least one recess extending through the at least one parallel guide element in the Z direction, through which projects a base body portion of the base body.

* * * * *